United States Patent
Agnoff

(10) Patent No.: US 6,419,070 B1
(45) Date of Patent: *Jul. 16, 2002

(54) STUB SHAFT CONVEYOR ROLLER

(75) Inventor: Charles Agnoff, Wilmington, NC (US)

(73) Assignee: Interroll Holding AG, San Antonio (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/796,254

(22) Filed: Feb. 28, 2001

Related U.S. Application Data

(63) Continuation of application No. 09/560,484, filed on Apr. 28, 2000, now Pat. No. 6,209,702, which is a continuation of application No. 08/939,966, filed on Sep. 29, 1997, now Pat. No. 6,076,647.

(51) Int. Cl.[7] .............................................. B65G 15/00

(52) U.S. Cl. ........................ 193/37; 193/35 R; 198/780; 384/215

(58) Field of Search ................................ 193/37, 35 R; 384/130, 144, 134, 142

(56) References Cited

U.S. PATENT DOCUMENTS

| | | | |
|---|---|---|---|
| 1,362,910 A | * 12/1920 | Zoeller et al. ................ | 193/37 |
| 1,817,134 A | 8/1931 | Eighmey | |
| 1,919,495 A | 7/1933 | Allen | |
| 1,949,817 A | 3/1934 | Stonefield et al. | |
| 2,135,175 A | 11/1938 | Fallon | |
| 2,152,076 A | 3/1939 | Menough | |
| 2,198,421 A | 4/1940 | Wise | |
| 2,696,283 A | 12/1954 | Barry | |
| 2,699,953 A | 1/1955 | Chaddick | |

(List continued on next page.)

FOREIGN PATENT DOCUMENTS

| | | | |
|---|---|---|---|
| DE | 254043 | 5/1967 | |
| DE | 66833 | 5/1969 | |
| DE | 2 324 256 | 12/1974 | |
| DE | 2324256 | 12/1974 | |
| DE | 3903051 C | 5/1990 | |
| EP | 0059270 | * 9/1982 | .................. 193/37 |
| EP | 0061893 | 10/1982 | |
| EP | 0566627 B1 | 10/1993 | |
| FR | 1107271 | 12/1955 | |
| FR | 2562045 | 10/1985 | |
| FR | 2521021 A | 3/1989 | |
| GB | 706868 | 4/1954 | |
| GB | 1293490 | 10/1972 | |
| GB | 2041111 A | 9/1980 | |
| GB | 2095193 A | 9/1982 | |
| GB | 2269637 A | 2/1994 | |
| JP | 48-87581 | 11/1973 | |
| JP | 62-28576 | 7/1987 | |
| JP | 64-32814 | 3/1989 | |
| JP | 06-127657 | 5/1994 | |
| JP | 06-239437 | 8/1994 | |
| JP | 08-258948 | 10/1996 | |

OTHER PUBLICATIONS

*The Leader*, Master Catalog (MC) 2001, Ralphs–Pugh Co. (99 pages).

Primary Examiner—Christopher P. Ellis
Assistant Examiner—Mark A. Deuble
(74) Attorney, Agent, or Firm—Coats & Bennett, P.L.L.C.

(57) ABSTRACT

A conveyor roller includes a generally cylindrical roller tube and a pair of stub shafts rotatably mounted in each end thereof. At least one of the stub shafts is mounted for axial movement between an extended position and a retracted position. When in the extended position, the stub shafts on each end of the conveyor engage respective mounting holes in the conveyor frame. To insert the conveyor roller in the conveyor frame, the movable stub shaft is moved to a retracted position while the roller is lowered into the conveyor frame. When the stub shaft aligns with the mounting holes in the conveyor frame, the stub shaft is urged back to the extended position by a biasing member to engage the mounting hole in the conveyor frame.

7 Claims, 4 Drawing Sheets

U.S. PATENT DOCUMENTS

| | | |
|---|---|---|
| 2,844,370 A | 7/1958 | Thomas |
| 2,913,141 A | 11/1959 | Woodruff et al. |
| 3,051,404 A | 8/1962 | Ritchey |
| 3,353,644 A | 11/1967 | McNash et al. |
| 3,502,197 A | 3/1970 | Kato et al. |
| 3,599,769 A | 8/1971 | Gardella |
| 3,610,387 A | 10/1971 | Stein |
| 3,713,521 A | 1/1973 | Moritake |
| 3,772,751 A | 11/1973 | Lovett |
| 3,793,689 A | 2/1974 | Specth |
| 3,841,721 A | 10/1974 | Coutant et al. |
| 3,888,343 A | 6/1975 | Snyder |
| 3,899,063 A | 8/1975 | Pollard |
| 3,957,147 A * | 5/1976 | Specht ................. 193/37 |
| 3,959,629 A | 5/1976 | Specht et al. |
| 4,325,473 A | 4/1982 | Garnett |
| 4,606,659 A | 8/1986 | Hogan |
| 4,664,243 A | 5/1987 | Martin |
| 4,852,230 A * | 8/1989 | Yu ................. 193/37 |
| 5,025,917 A * | 6/1991 | Smith et al. ................. 198/842 |
| 5,046,869 A | 9/1991 | Roberts et al. |
| 5,088,596 A | 2/1992 | Agnoff |
| 5,380,104 A | 1/1995 | Garnett |
| 5,421,442 A | 6/1995 | Agnoff |
| 6,076,647 A * | 6/2000 | Agnoff ................. 193/37 |
| 6,209,702 B1 * | 4/2001 | Agnoff ................. 193/37 |

* cited by examiner

STUB SHAFT CONVEYOR ROLLER

This is a Continuation Application of U.S. patent application Ser. No. 09/560,484, filed Apr. 28, 2000, now issued as U.S. Pat. No. 6,209,702, which itself is a continuation of prior U.S. patent application Ser. No. 08/939,966 originally filed Sep. 29, 1997, and now issued as U.S. Pat. No. 6,076,647.

FIELD OF THE INVENTION

The present invention relates generally to improvements in rollers for conveyors and, more particularly, to a conveyor roller of the type which is mounted on stub shafts.

BACKGROUND OF THE INVENTION

Roller conveyors are commonly used in many industries to move packages or materials. In general, a conveyor roller comprises a plurality of individual rollers mounted between two parallel frames. The roller typically comprises a tube having a bearing in each end thereof which is rotatably journaled on a roller shaft that extends longitudinally through the tube. The roller shaft protrudes from each end of the roller tube and engages mounting holes in the frame.

Frequently, the roller shaft not only serves to mount the roller, but also functions as a structural element of the conveyor frame. In such cases, the ends of the shaft are drilled and tapped. Bolts extending from the outside of the frame are threaded into the tapped holes in the roller shaft to secure the frame members and rollers together. This approach to the construction of conveyors makes assembly of the conveyor time consuming and difficult. Moreover, this method of constructing conveyors makes it difficult to replace a single roller.

Another method to mount rollers in a conveyor frame is to use a roller having a through-shaft which is spring-loaded. In this case, the frame members are held together independently by a series of cross members rather than through the rollers. The rollers generally are installed after the frame is assembled. To install the roller, the shaft is moved axially against the force of the spring and "snaps" into place when the shaft aligns with the mounting hole in the frame member. This method makes assembly of the conveyor much simpler and facilitates the replacement of rollers when they become worn or defective.

Several attempts have been made in the past to eliminate through-shafts in the roller, In place of a single thru-shaft, separate stub shafts have been used to support opposing ends of the conveyor roller. Typically, these stub shafts are bolted to the conveyor frame before the frame is assembled. The conveyor roller is then inserted over the stub shaft as the frame is locked together to create a final assembly. This method of mounting rollers in conveyors also makes assembly difficult. Moreover, this method essentially precludes prefabrication of the conveyor frame.

Accordingly, there is a need for a new method for mounting conveyor rollers in a frame which does not rely on a through-shaft extending through the roller, allows prefabrication of the conveyor frame, and facilitates ease of assembly.

SUMMARY AND OBJECTS OF THE INVENTION

The present invention combines the advantages of spring-loaded shafts, which make installation of the roller quick and easy, and a shaftless design which eliminates the need for a longitudinal through-shaft. To achieve these advantages, the present invention utilizes a sliding stub shaft which is spring-biased to an extended position. The stub shaft can be pushed inward against the force of the spring to allow insertion of the roller into a prefabricated frame. When the stub shaft aligns with the mounting holes in the frame, the spring pushes the stub shaft outward to engage the mounting hole. One advantage of the present invention is that it enables quick and easy assembly of a conveyor. The conveyor frame can be prefabricated at the factory while the rollers are installed on site. Further, the present invention allows for easy replacement of a worn or defective roller without the need to disassemble an entire conveyor section.

The spring-biasing of the stub shaft also produces advantages not before realized in conveyors. The spring-biasing tends to center the roller after it is installed so that its rotating members do not rub against either frame member. The spring also allows shock absorption to take place when packages or other conveyed materials are moved laterally across the conveyor as they are loaded or unloaded. Furthermore, the constant preload on the springs eliminates vibration and noise which would resonate through the conveyor frame structure.

Yet another advantage of the present invention is its reduced weight. By eliminating a through-shaft that extends through the roller tube and replacing it with two smaller stub shafts, the total weight of the conveyor roller is reduced. Since conveyors use many individual rollers, the total weight reduction in a conveyor can be substantial. This weight reduction makes the conveyors more portable in the event that the conveyors need to be moved from one place to another. Also, shipping costs are reduced.

Yet another advantage which is beneficial in the food handling industry, is the ability to produce a relatively low cost, non-corrosive conveyor roller. In the food handling and chemical industries, conveyor rollers frequently employ stainless steel through-shafts. Sometimes, the additional cost of stainless steel makes the installation and use of conveyor systems impractical from a cost standpoint. By eliminating the through-shaft in its entirety, the stub shaft can be supplied with sophisticated corrosion resistant materials. Because the parts are so small, it does not negatively impact the overall cost of the system.

Another feature of the conveyor roller is increased safety. The retention of the roller in the frame is assured even in the event of bolt failure or vibration which could cause the bolt to fall out. In either instance, the spring-loading bias on the stub shaft acts as a reductive retention system to prevent the roller from falling out of the frame.

Other objects and advantages of the present invention will become apparent and obvious from a study of the following description and the accompanying drawings.

DETAILED DESCRIPTION OF THE INVENTION

Figure 1:
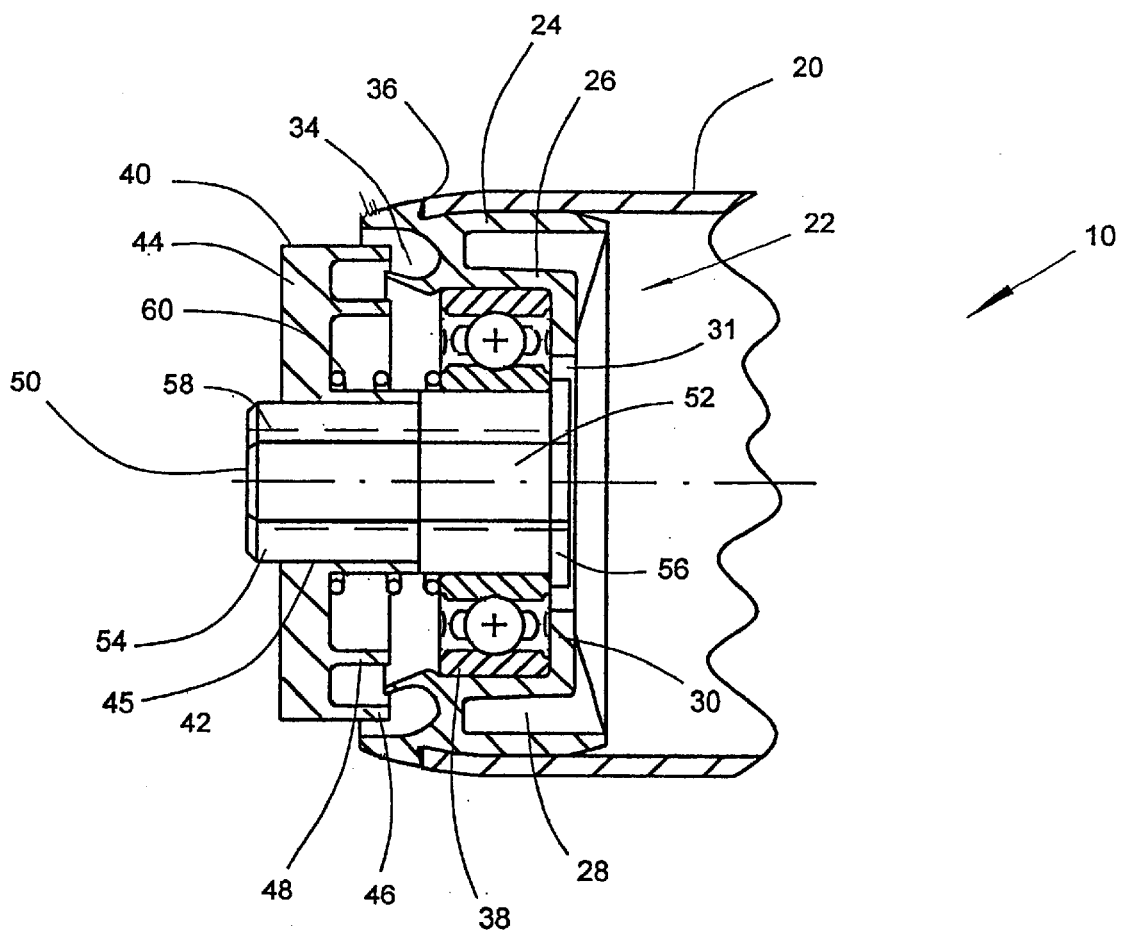
FIG. 1 is a partial cross section of the conveyor roller of the present invention showing the stub shaft in a normal extended position.

Referring now to the drawings, and particularly to FIG. 1, the conveyor roller of the present invention is shown therein an indicated generally by the numeral 10. The roller 10 is adapted for use in conveyors, packaging machinery, linear motion material handling devices, and treadmills, but may also have other applications. The roller 10 is mounted between parallel frame members 12 which support the roller 10 at opposite ends thereof. The frame members 12 form part of a conveyor frame and may be held together, for example, by cross members (not shown). Each frame member 12 has a series of mounting holes 14 formed therein for mounting the roller 10. The present invention is particularly related to an improved mounting system for mounting the roller 10 in the conveyor frame.

The roller 10 comprises a generally cylindrical roller tube 20 which is rotatably journaled on a pair of stub shafts 50. A bearing housing 22 is inserted into each end of the roller tube 20 and houses a bearing 38 in which the stub shaft 50 is journaled. The bearing 38 is retained by friction in the bearing housing 22. A bearing shield 40 fits on the outer end of the stub shaft 50. The stub shaft 50 and bearing shield 40 are biased by a spring 60 to an extended position as shown in FIG. 1. The stub shaft 50 can be moved to a retracted position by applying a force to the end of the stub shaft 50. With the stub shaft 50 in a retracted position, it is easy to insert the roller 10 into an already assembled conveyor frame.

The bearing housing 22 is typically molded from a plastic material. The bearing housing 22 includes an outer cylindrical wall 24 and an inner cylindrical wall 26 which define an annular cavity 28 therebetween. The outer wall 24 is sized to provide an interference fit with the roller tube 20. The inner wall 26 frictionally engages and holds the roller bearing 38. The roller bearing 38 is pressed into the bearing housing 22 until it engages the back wall 30. Back wall 30 of the bearing housing 22 includes a center opening 31 through which the stub shaft 50 extends.

The outer end 32 of the bearing housing 22 includes a seal cavity 34 which, in conjunction with the bearing shield 40, provides a labyrinth seal to prevent dirt and other contaminants from reaching the bearing 38. A lip 36 is also formed at the outer end 32 of the end cap 22 which butts against the end of the roller tube 20, which is bent inward slightly to help hold the bearing housing 22 in place. The inner end of the outer wall 24 is slightly tapered to facilitate insertion of the end cap 22 into the roller tube 20.

As previously mentioned, the bearing housing 22 houses a bearing 38. The bearing 38 may preferably be a radial ball type bearing as shown in FIG. 1. However, it should be understood that the present invention will work equally well with molded plastic or bronze bushing designs. The function of the bearing 38 is to reduce friction as the roller tube 20 rotates about the stub shaft 50.

The stub shaft 50 includes an inner portion 52 and an outer portion 54. The inner portion 52 has a cylindrical configuration and is journaled in the bearing 38. It should be noted, however, that the inner portion 52 of the stub shaft 50 and the inner race of the bearing 34 could have a polygonal configuration without departing from the spirit of the present invention. The outer portion 54 of the stub shaft 50 preferably has a hexagonal configuration and is adapted to mate with a similarly shaped and sized opening 14 in the mounting frame 12.

A small flange 56 is formed at the inner end of the stub shaft 50. The purpose of the flange 56 is to act as a stop when the stub shaft 50 reaches an extended position. The flange 56 is designed to butt against the bearing 38 to prevent the further extension of the stub shaft 50.

A threaded hole 58 is located through the center of the stub shaft formed at the end of the outer portion 54. The threaded hole 58 is adapted to receive a bolt 62 which extends from the outside of the frame 12 into the threaded hole 58. The purpose of the bolt 62 is to secure the roller 10 in place after it has been inserted into the frame 12.

The bearing shield 40 is press fit onto the outer portion 54 of the stub shaft 50. The bearing shield 40 includes a hub 42 and a cover portion 44. The hub 42 includes a hexagonal bore 45 which is sized to provide a tight, frictional fit with the outer portion 54 of the stub shaft 50. The cover portion 44 extends radially outward from the hub 42 to provide a cover for the bearing 34. Two cylindrical walls 46 and 48 project inwardly from the back side of the cover portion 44. The outer wall 46 is disposed at the periphery of the cover portion 44. The inner wall 46 is spaced slightly inward from the outer wall 44 and is concentric with the outer wall 46. The walls 46 and 48, along with the previously mentioned seal cavity 34, forms a labyrinth seal.

The spring 60 is disposed around the hub 42 of the bearing shield 40. One end of the spring 60 presses against the bearing 38 while the opposite end presses against the bearing shield 40. Thus, the spring 36 biases the stub shaft 50 to an extended position.

Figure 2:
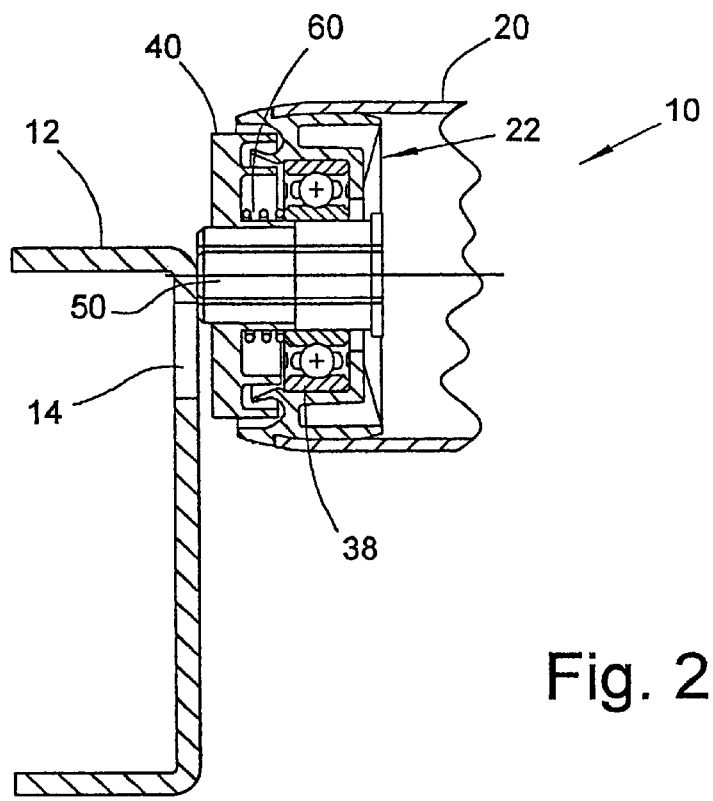
FIG. 2 is a cross section of the conveyor roller being inserted into a conveyor frame showing the stub shaft in a retracted position.
Figure 3:
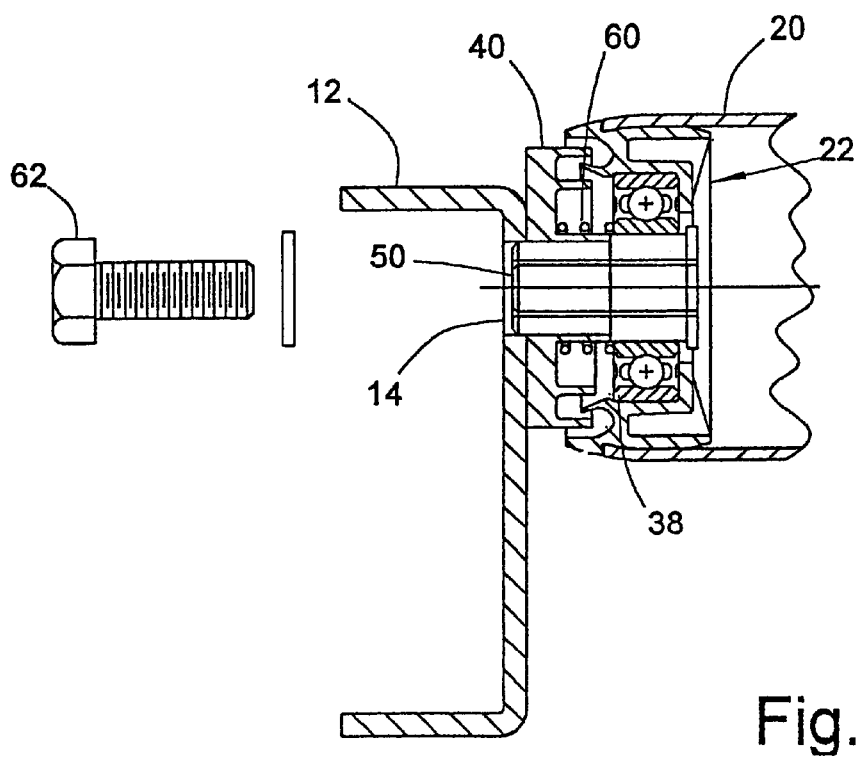
FIG. 3 is a cross section of the conveyor roller after its insertion into the frame showing the stub shaft in a partially extended position and engaged with the mounting holes in the frame member.

To install the roller 10 between parallel frame members 12, the roller 10 is held in a tilted position while the stub shaft 50 at one end is inserted into its mating mounting hole 14. After the first end of the roller is inserted into the mounting hole 14, the stub shaft 50 on the opposing end is pressed inward to move the stub shaft 50 to a retracted position (see FIG. 2). The second end is then lowered between the frame members 12 until the stub shaft 50 is aligned with its mating mounting hole 14 in the frame member 12. When the stub shaft 50 is aligned with the mounting hole 14, the spring 36 urges the stub shaft 50 to an extended position so that it engages the mounting hole 14 (see FIG. 3). The bolt 62 is then inserted through the mounting hole 14 in the frame member 12 and threaded into the threaded hole 58 in the stub shaft 50 to secure the roller 10 in place.

Figure 5:
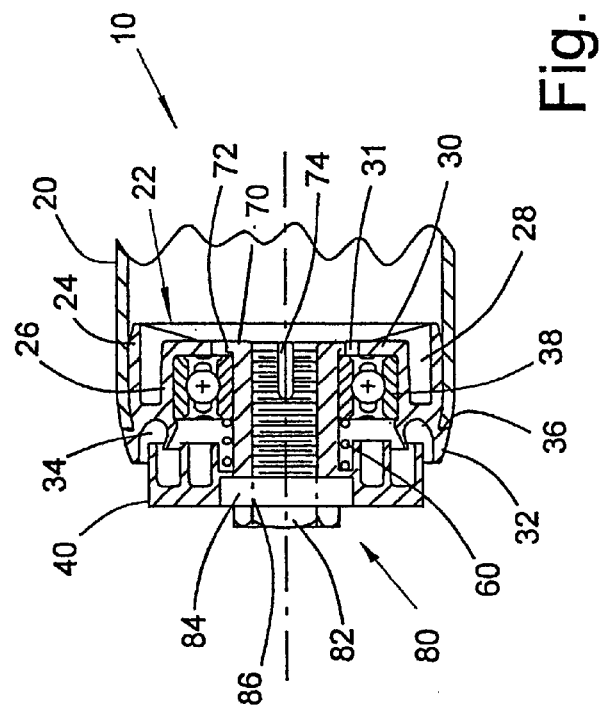
FIG. 5 is a partial cross section of the conveyor roller of the second embodiment showing the stub shaft in a normal extended position.
Figure 4:
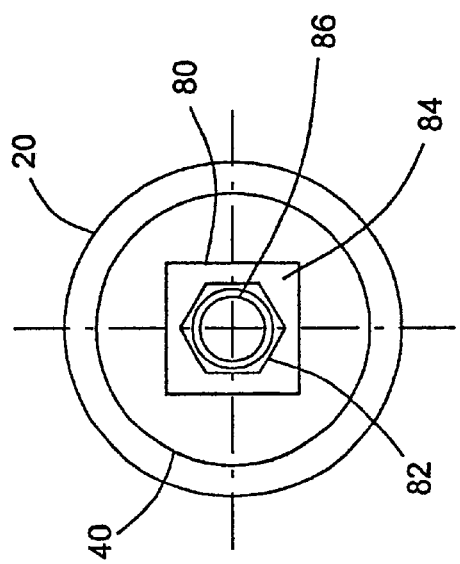
FIG. 4 is an end view of the second embodiment of the conveyor roller.
Figure 6:
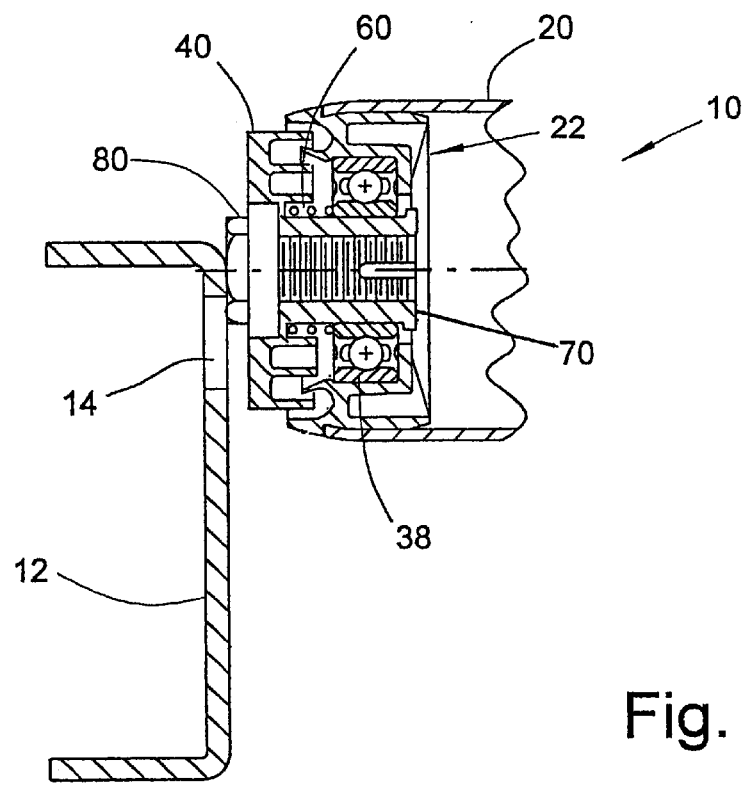
FIG. 6 is a cross section of the conveyor roller of the second embodiment being inserted into a conveyor frame showing the stub shaft in a retracted position.
Figure 7:
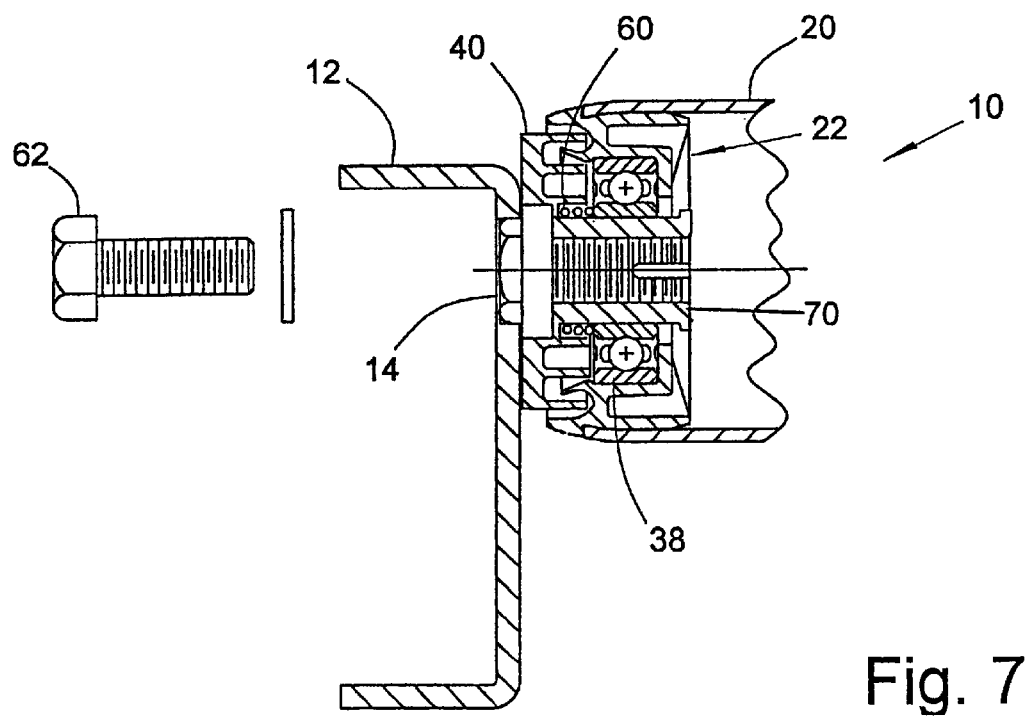
FIG. 7 is a cross section of the conveyor roller of the second embodiment after its insertion into the frame showing the stub shaft in a partially extended position and engaged with the mounting holes in the frame member.

FIGS. 4–6 illustrate an alternate embodiment of the roller 10. This embodiment uses the same roller 10 and bearing housing 22 as previously described. The description of these elements, therefore, will not be repeated. However, it should be noted that the reference numbers in FIGS. 4–6 which are the same as the reference numbers in FIGS. 1–3 indicate the same parts.

The second embodiment, shown in FIGS. 4–6, eliminates the stub shaft 50. Instead, a bearing shaft 70 is integrally formed with the bearing shield 40. The bearing shaft 70 is journalled in the bearing 38. The bearing shaft 70 is hollow and internally threaded. The inner end 72 of the bearing shaft is designed to retain the bearing shaft 70 in place. Two diametrically opposed relief slots 74 are formed in the inner end 72 of the bearing shaft 70. The purpose of the relief slots 74 is to facilitate insertion of the bearing shaft 70 through the bearing 38. When the bearing shaft 70 is pressed into the bearing 38, the inner end 72 collapses inwardly to allow the bearing shaft 70 to pass through the bearing 38. When the bearing shaft 70 passes through the bearing 38, the inner end 72 expands back to its original form due to the inherent resiliency of the material.

An insert 80 is adapted to fit into a recess formed in the outer surface of the bearing shield 40. The insert 80 includes a hexagonal stub member 82 and a base portion 84. The hexagonal stub member 82 mates with the hole 14 in the frame member 12. The base portion 84 of the insert 80 fits into a recess or socket formed in the outer surface of the bearing shield 40. The base 84 of the insert 80 and the recess both have a square configuration to prevent rotation of the insert 80 relative to the bearing shield 40.

A hole 86 extends through the insert 80. The bolt 62, which secures the roller 10 to the frame member 12, passes through the insert 80 and engages the threads on the inner surface of the bearing shaft 70. Consequently, the insert 80 gets captured between the bearing shield 40 and the frame member 12 so that it cannot be dislodged.

One advantage of using insert 80 is that it can be easily interchanged in the field. For example, if the frame member 12 has square mounting holes 14 rather than hexagonal mounting holes 14, an insert 80 with a square stub 82 can be inserted into the shield 40. Without the replaceable insert 80, it would be considerably more difficult to modify the roller to fit a square mounting hole 14.

Based on the foregoing, it will be apparent that the conveyor roller 10 of the present invention can be easily installed and removed from a pre-fabricated conveyor frame. Moreover, the present invention employs a "shaftless" design which substantially reduces the weight of the roller.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A conveyor roller comprising:
   a) a generally cylindrical roller tube having opposing ends;
   b) an end cap inserted into one end of said roller tube;
   c) a bearing disposed within said end cap;
   d) a stub shaft journaled in said bearing so as to allow rotation of said roller tube around a rotational axis of said roller, said stub shaft being movable between an extended position and a retracted position;
   e) a bearing shield disposed on an outer end of said stub shaft;
   f) a biasing member between said bearing shield and said bearing for biasing the stub shaft to said extended position; and
   g) a stop formed on said stub shaft to limit the axial movement of said stub shaft when the stub shaft reaches the extended position.

2. The roller of claim 1, wherein said biasing member contacts non-rotating members such that during rotation of the roller, the biasing member remains stationary.

3. The roller of claim 1, wherein said stop formed on said stub shaft contacts an inner race of said bearing.

4. An insert for mounting within an end of a cylindrical roller comprising:
   a) an end cap having an outer wall to fit within the cylindrical roller, said end cap further comprising a cavity seal;
   b) a bearing disposed within said end cap;
   c) a stub shaft journaled within said bearing and being movable between an extended position and a retracted position;
   d) a bearing shield fitted to said stub shaft and having a bore and a cover portion, said bore being sized to provide a frictional fit with said stub shaft, said cover portion extending radially outward from said bore to cover said bearing and having cylindrical walls extending outward from an inner side to fit within the cavity seal and form a labyrinth seal;
   e) a biasing member between the bearing shield and the bearing to bias the stub shaft to the extended position; and
   f) a stop formed on said stub shaft to limit the axial movement of said stub shaft when the stub shaft reaches the extended position.

5. The insert of claim 4, wherein said cavity seal comprises projections extending outward from said end cap, said projections and said cylindrical walls being in an overlapping arrangement during both said extended and retracted positions of said bearing shield.

6. The insert of claim 4, wherein a first end of said biasing member contacts said bearing and a second end of said biasing member contacts said bearing shield.

7. The insert of claim 4, wherein said bearing shield further comprises a hub aligned with said bore to extend around said stub shaft.

* * * * *